United States Patent [19]

Worley et al.

[11] 3,701,359
[45] Oct. 31, 1972

[54] HIGH TEMPERATURE SLIDE VALVE

[72] Inventors: Arthur C. Worley, Mendham; Ronald S. Kane, Saddle Brook, both of N.Y.

[73] Assignee: Esso Research and Engineering Company

[22] Filed: Jan. 25, 1971

[21] Appl. No.: 109,122

[52] U.S. Cl. .................. 137/375, 251/124, 251/326
[51] Int. Cl. ............................................. F16k 3/00
[58] Field of Search ...... 137/340, 375; 251/124, 326, 251/329

[56] References Cited

UNITED STATES PATENTS

| | | |
|---|---|---|
| 2,467,945 | 4/1949 | Pottmeyer .................. 137/340 |
| 3,136,330 | 6/1964 | Dowling ..................... 137/340 |
| 1,995,727 | 3/1935 | Wetherbee ................ 137/340 |
| 2,352,799 | 7/1944 | Newton ..................... 137/375 |
| 2,575,464 | 11/1951 | Olsen ..................... 251/124 X |
| 3,217,739 | 11/1965 | La Valley et al. ......... 137/375 |

*Primary Examiner*—Henry T. Klinksiek
*Attorney*—Manahan and Wohlers and F. Donald Paris

[57] ABSTRACT

An internally insulated slide valve for throttling and blocking solids flow at high temperature and moderate pressure in fluid solids transfer lines. The metal body of the valve operates at lower temperatures than if it had no insulation. Internal parts of the valve are supported so that they do not transmit excessive heat through the supporting members to the body.

6 Claims, 5 Drawing Figures

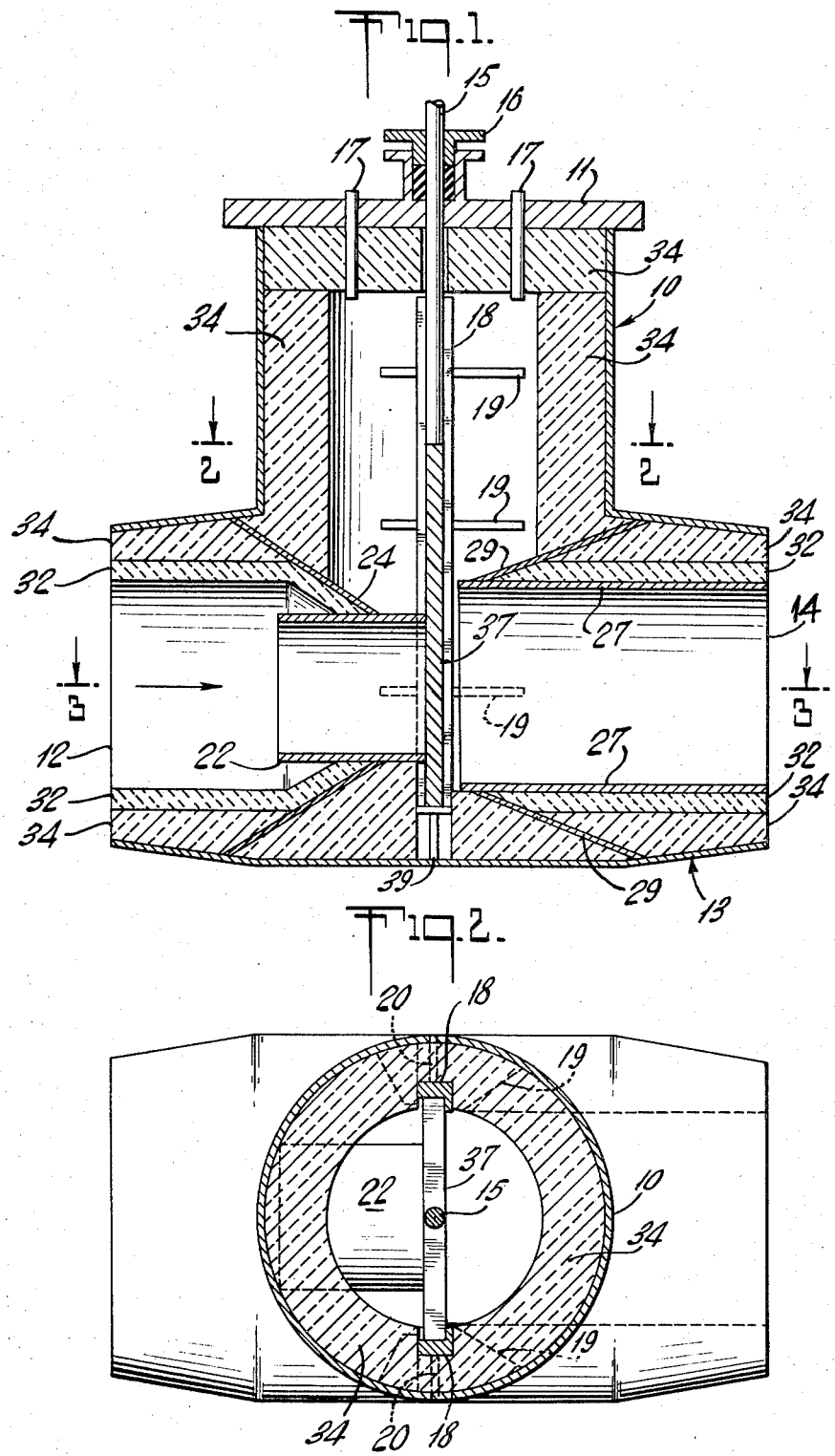

INVENTORS
ARTHUR C. WORLEY
RONALD S. KANE
BY
ATTORNEY

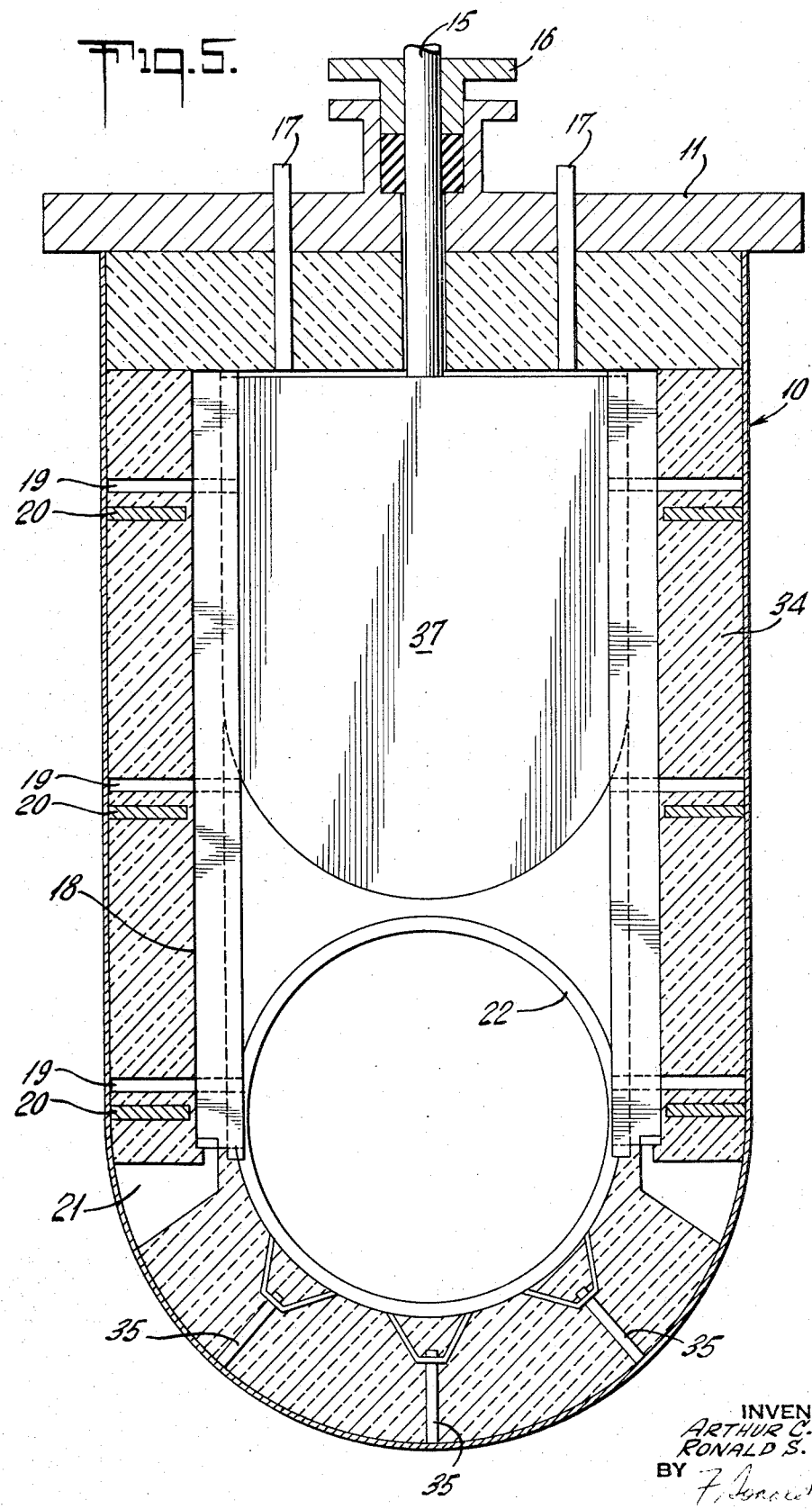

HIGH TEMPERATURE SLIDE VALVE

BACKGROUND OF THE INVENTION

This invention pertains to a slide valve for use in fluid solids service. Particularly, it pertains to a valve designed for high temperature fluid solids service where present designs are not satisfactory. Valves in fluid solids service are subject to especially heavy erosive wear. In addition, they are located in services which make them difficult to maintain should problems arise during operation of the unit in which they are used. Such units often run for several years without shutting down, making the reliability of the slide valves of substantial importance. Such valves must be both reliable and resistant to the erosive service in which they are used.

An industrial processing conditions have become more severe, slide valves must operate at higher temperatures than have heretofore been common. At the same time, new processes which are developed also may operate at much higher temperatures than have been usual in the past. As a result of these developments, the service for slide valves becomes increasingly severe. Inasmuch as ordinary steels lose strength at high temperatures, it becomes necessary to use much more expensive metals for valves used at the higher temperatures. High temperatures also introduce additional problems in that the hot valve becomes a weak point in the line and consequently, may result in shutdown of the entire unit because of a slide valve failure by valve body distortion. At high temperatures, external insulation normally is not used on the valve body in order to maximize the strength of the valve. However, this results in excessive heat losses from the valve.

There exists a need for valves which will satisfy the severe requirements which have developed with modern fluid solids processing. Such valves have not heretofore been available. The valve design which is disclosed herein has been developed to satisfy the demand for suitable high temperature valves. Although a few insulated valves have been designed in the past, these prior art valves did not anticipate there use in fluid solids service and the valve herein disclosed in uniquely designed for such high temperature, highly erosive operating conditions.

SUMMARY OF THE INVENTION

To overcome the problems associated with high temperature fluid solids service, the valve uses internal insulation to provide protection for the metallic body of the valve. The valve is provided with alloy internal materials having high temperature strength. The alloy internals are supported so as to prevent the high temperatures inside the insulation layer from reaching the body and thereby weakening it. A refractory lining is incorporated in the insulation system in order to provide erosive wear protection. A slide gate is used in order to block off the flow as required by the process. In certain embodiments, this slide gate may also serve the function of throttling or controlling the flow through the valve. Various types of value designs are described and illustrated within this disclosure.

BRIEF DESCRIPTION OF THE DRAWINGS

FIG. 1 is a cross-sectional side view of a slide valve for throttling service constructed according to the present invention.

FIG. 2 is a cross-sectional view of the slide valve taken substantially along the line 2—2 of FIG. 1 showing the bonnet and slide.

FIG. 5 is an end view of the slide valve of FIG. 4 taken substantially along line 5—5 of FIG. 4.

DESCRIPTION OF THE PREFERRED EMBODIMENT

Figure 3:
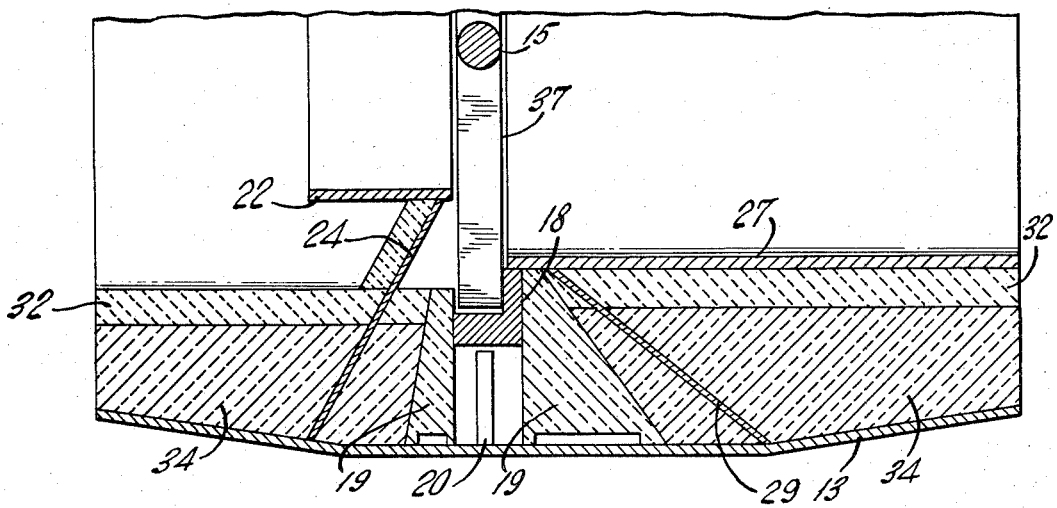
FIG. 3 is a cross-sectional view of the slide valve taken substantially along the line 3—3 of FIG. 1 showing details of the supports for the valve seat, guide, and wear plate.

The insulated slide valve of the present invention as illustrated in the drawings is generally described as follows:

The valve comprises a cylindrical metal body with conical ends generally designated 13 having an inlet 12 and an outlet 14, a bonnet 10 disposed normal to the body 13, and a bonnet cover 11. A slide gate 37 is movably mounted within the body and bonnet normal to the direction of flow in order to provide a means for blocking the flow of fluid solids through the body of the valve. A cylindrical valve seat 22 is centered on the axis of the valve body and supported by a truncated conical member 24 within the valve body. The seat is located so as to channel the fluid solids flow through the portion of the valve to be blocked off by the slide gate 37. The slide gate 37 is supported and guided by vertical guides 18 extending from the valve body 13 through the bonnet 10.

In FIG. 1, one configuration of the valve is shown in which the cylindrical valve seat 22 is smaller than the normal internal diameter of the valve, thereby providing the ability to throttle flow of fluid solids through the valve. In this configuration, a wear plate 27 lines the valve body downstream of the slide gate 37 in order to reduce abrasion due to turbulence created by throttling flow. This wear plate is centered within the valve body 13 and is supported by a truncated conical support 29. Refractory insulating linings designated 32 are used on both the inlet 12 and outlet 14 sides of the valve. At the inlet side of the valve, lining 32 has a tapered section in order to protect support 24. These linings 32 provide erosion resistance to the fluid solids flow excepting the area of highest turbulence on the outlet side of the valve, which is protected by the previously mentioned wear plate 27. Thermal insulation 34 is located between the refractory lining 32 and the metal valve body 13. This insulation extends upward into the bonnet portion 10 and around the underside of the bonnet cover 11 in order to provide complete protection for the metal valve body from the extreme temperatures involved in the fluid solids process. In the area of the bonnet a refractory lining is normally not required. Purge connections 17 are shown extending through the bonnet cover 11 and the corresponding insulation 34 on the inside of the cover. Purge connections are provided in order to clear the fluid solids which collect within the bonnet cavity and which could thereby cause a restriction in movement of the slide 37. The valve stem 15 by which slide 37 is operated passes through bonnet cover 11 and is sealed by packing gland 16. The previously referred to vertical guides 18 are positioned by support clips 19 which are shaped in such a way as to prevent excessive heat leakage from the internal surfaces of the valve to the surrounding metal body 13. The extent of movement of the slide gate 37 is limited by means of a metal stop or abutment member 39 provided on the side of the body 13 opposite the bonnet 10.

Figure 4:
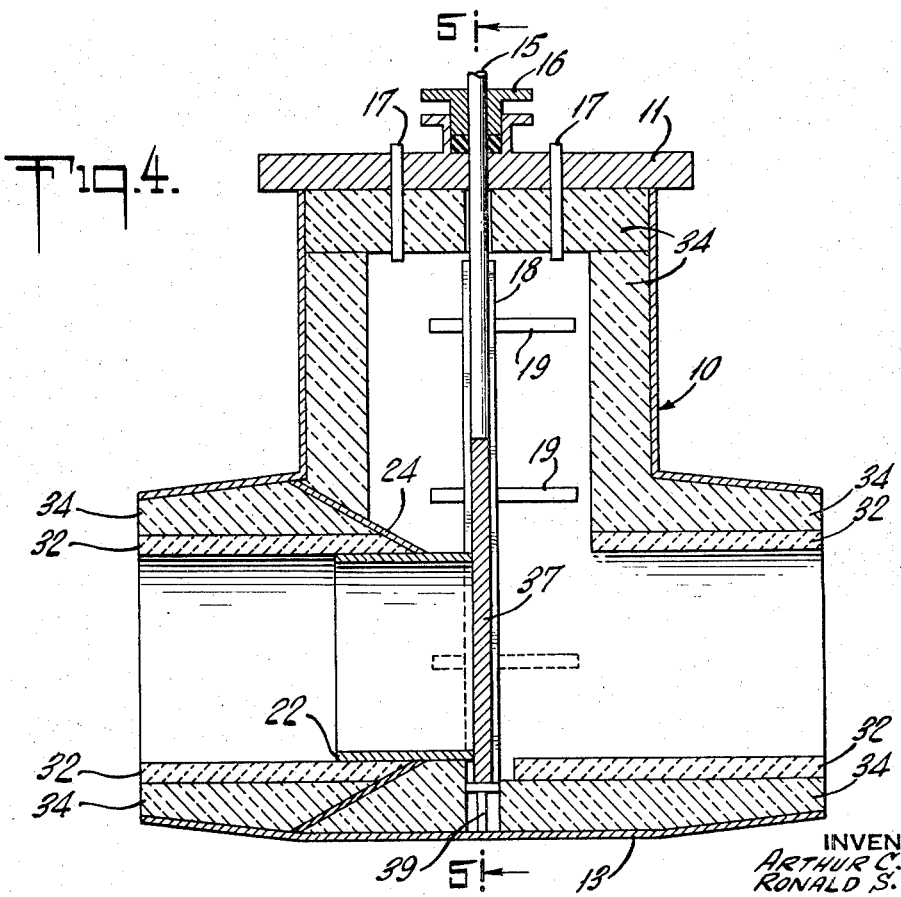
FIG. 4 is a cross-sectional view of a slide valve for blocking service constructed according to the present invention.

Essentially the same valve configuration is shown in FIG. 4 except that in this variation the cylindrical valve seat 22 has an external diameter equal to the internal diameter of the refractory lining 32. The refractory lining need not have the tapered section required in FIG. 1 where the cylindrical seat was smaller than the internal lining. In such a valve, throttling is not feasible and the valve provides only blocking action and therefore functions only as an on-off valve. The reduced turbulence in such a valve eliminates the need for the wear plate which is shown as 27 in FIG. 1, and in FIG. 4 only the refractory lining 32 is required. The structural details of the valve internals are essentially the same as described heretofore.

FIG. 5 shows an end view of the valve of FIG. 4, with the slide being disposed in an open or upper position and illustrating several features of the valve construction not previously shown. The insulation 34 requires supports which are shown as 35 in FIG. 5. These supports are commercially available and those shown as 35 are typical. The guides 18 are secured by retaining clips 21 at the bottom adjacent the seat 22 prevent the guides from moving downwards as the slide 37 moves into operable engagement with the seat 22, that is, in closed position.

In FIG. 2, a sectional view is shown of the valve of FIG. 1 illustrating the location of the slide guides 18 in relation to insulation 34 and the slide 37 itself.

FIG. 3 illustrates in an enlarged view, a portion of the slide valve taken substantially along line 3—3 of FIG. 1 showing details of the supports for the valve seat, guide and wear plate. In particular, it is possible to more clearly observe that the vertical guides 18 which position the slide 37 are prevented from moving parallel to the direction of flow by means of support clips 19. Movement of the slide gate 37 in a direction normal to the direction of flow is prevented by stop 20 which limits the movement of the guides 18. Clearance is provided between the stops 20 and the gate 37 when the valve is cool to allow for expansion upon temperature rise. It will be understood that the two configurations of the new valve design illustrated are typical for blocking and throttling services. Other modifications can be made to the details of the valve construction without departing from the spirit of the invention.

Having described the detailed construction of the slide valve, the invention is set forth in the following claims. What is claimed is:

1. A slide valve for use in high temperature fluid solids service comprising:
   a. a hollow body having inlet and outlet portions,
   b. an insulated bonnet normal to said body located between said inlet and outlet portions,
   c. valve seat disposed within said body and adjacent said bonnet,
   d. means for supporting said valve seat from said body,
   e. a first sleeve comprising refractory material lining said inlet portion of said body for protection from erosion by fluid solids passing therethrough,
   f. first insulation means located between said first sleeve and said body for preventing exposure of said valve body to the temperature of the fluid solids flowing inside said first refractory sleeve,
   g. a second sleeve comprising refractory material lining said outlet portion of said body for protection from erosion by fluid solids passing therethrough,
   h. second insulation means located between said second sleeve and said body for preventing exposure of said valve body to the temperature of the fluid solids flowing inside said second refractory sleeve,
   i. a solid gate member mounted by sliding movement within said body and said bonnet normal to the direction of flow through said body whereby when said gate is operably disposed adjacent said valve seat, said gate member is adapted to block fluid solids flow through said body,
   j. guides for said solid gate member to position said gate member within said body, said guides being attached relative to said body by support means.

2. The valve of claim 1 wherein said means for supporting said valve seat is a frusto conical-shaped member attached to the inlet portion of the metallic body.

3. The valve of claim 1 wherein said valve seat is cylindrical.

4. The valve of claim 1 wherein said second refractory sleeve lining the outlet portion of the body is covered with a wear plate, said wear plate being supported relative to said body, thereby protecting refractory sleeve from erosion.

5. The valve of claim 3 wherein the external diameter of said valve seat is the same as the internal diameter of said first refractory sleeve whereby said valve seat support means is within said first sleeve of refractory material and said first insulation and is not exposed to erosion from fluid solids.

6. The valve of claim 3 wherein the external diameter of said valve seat is smaller than the internal diameter of said first refractory sleeve and said valve seat support means extends from said first refractory sleeve into the flow path through the valve and said first refractory sleeve is extended and conformed to the shape of said valve seat support means on the side facing the flow through the valve thereby protecting said support means from erosion by fluid solids flowing therethrough.

* * * * *